United States Patent [19]

Bühler

[11] Patent Number: 4,586,188
[45] Date of Patent: Apr. 29, 1986

[54] APPARATUS FOR CONVERTING A THREE-PHASE ARC FURNACE TO D.C. OPERATION

[75] Inventor: Karl Bühler, Nussbaumen, Switzerland

[73] Assignee: BBC Brown, Boveri & Co., Ltd., Baden, Switzerland

[21] Appl. No.: 585,243

[22] Filed: Mar. 1, 1984

[30] Foreign Application Priority Data

Mar. 8, 1983 [CH] Switzerland .................. 1239/83

[51] Int. Cl.⁴ .......................................... H05B 7/144
[52] U.S. Cl. ................................................ 373/108
[58] Field of Search .................. 373/102, 104, 108

[56] References Cited

U.S. PATENT DOCUMENTS 2,927,143  3/1960  Jensen ................................. 373/108
3,789,127  1/1974  Bowman ............................. 373/108
3,949,151  4/1976  Kerton ................................ 373/108
4,461,010  7/1984  Titus ................................... 373/108

*Primary Examiner*—Roy N. Envall, Jr.
*Attorney, Agent, or Firm*—Oblon, Fisher, Spivak, McClelland & Maier

[57] ABSTRACT

An apparatus for converting an arc furnace installation from three-phase operation to d.c. operation wherein in order to ensure optimum d.c. operation after converting the three-phase arc furnace installation to d.c. operation, while retaining the three-phase furnace transformer and the high-voltage switchgear, there is connected an adaptation member (2, 7) for adjusting the arc voltage and/or for increasing the inductive reactance, in addition to the actual rectifier arrangement. This adaptation member is formed of a transformer, preferably an autotransformer, and/or a choke circuit.

6 Claims, 2 Drawing Figures

APPARATUS FOR CONVERTING A THREE-PHASE ARC FURNACE TO D.C. OPERATION

BACKGROUND OF THE INVENTION

1. Field of the Invention

The present invention relates to an apparatus for converting an arc furnace installation from three-phase operation to d.c. operation, wherein the arc furnaces includes a high-voltage transformer, a controllable three-phase furnace transformer, a furnace casing, and at least two electrodes.

2. Description of the Prior Art

The company brochure "Arc furnace installations Brown Boveri Arcmelt Type AM" of Messrs. Aktiengesellschaft Brown, Boveri & Cie., Baden/Switzerland, publication No. CH-IH 512434E (undated), in particular FIGS. 7 and 8 on pages 12 and 13, shows the conventional electrical supply system for a three-phase arc furnace.

Three-phase arc furnaces for the production of electric steel have been used for more than half a century. In this period, this type of furnace has been developed technically further and further and, in addition to the induction furnace, it is nowadays regarded as the most important electrical melting apparatus in the iron and steel industry.

Particularly in the melt-down phse, when the electrodes are in contact with feed material not yet molten, three-phase arc furnaces frequently cause short-circuits which are transmitted as a reaction to the supply network, in spite of very quickly responding electrode-adjustment systems. These reactions on the network—the so-called flickers—can lead to voltage dips in low-power supply networks, with detrimental consequences for the consumers connected to the same network.

Three-phase arc furnaces also tend to fluctuating arc lengths. This phenomenon, on the one hand, unfavourably influences the electrode consumption and puts a high thermal load on the refractory lining and, on the other hand, leads to a noise nuisance for the furnace operating crew.

The advances in the development of semi-conductor components in recent years have provided an incentive for conceiving d.c. arc furnaces for industrial use in the smelting of electric steel.

In introducing the d.c. arc furnace, as a melting apparatus replacing the three-phase arc furnace into the iron and steel industry, the main aim was to retain the proven properties of the arc furnace—economy, reliability and robustness—but to eliminate the abovementioned disadvantageous features of the three-phase arc furnace.

When any investment decisions on arc furnace installations have to be made, the iron and steel industry is confronted by two alternatives:

Either

New investment in a d.c. arc furnace installation or

Conversion of an already existing three-phase arc furnace installation to d.c. operation, while retaining usable, already existing parts of the installation and newly procuring only the constructional components required in addition.

Since nowadays three-phase arc furnaces are almost exclusively in operation, great importance must be attached to the second alternative, and this is certainly true from the point of view of economic considerations.

The initial situation, when converting an existing three-phase arc furnace installation to d.c. operation, is essentially as follows:

Retention of the controllable three-phase furnace transformer already existing,

Retention of the high-voltage installation associated with the furnace transformer, New procurement of a rectifier arrangement, New procurement of the high-current side of the arc furnace equipment, and New procurement or modification of the arc furnace itself, which essentially consists of the furnace casing and furnace cover, electrode-control device, and the rest.

When converting an existing three-phase arc furnace installation to d.c. operation, the obvious course in itself would be to insert a rectifier arrangement, for example a diode bridge circuit, by means of which the three-phase operation could be converted into d.c. operation, between the three-phase furnace transformer and the arc furnace. However, this measure would not lead to an operable d.c. arc furnace, in particular for the following reasons:

The inductive reactance of the high-current lines of the arc furnace, which represents a significant proportion of the total inductive reactance in three-phase operation and makes a significant contribution to the limitation of the furnace short-circuit current, then disappears in d.c. operation, and the ratio of the short-circuit current to the operating current of the furnace is increased in an inadmissable manner.

On the high-current side, the windings of the three-phase furnace transformers are arranged as open data connections which are closed outside the transformer. Between the furnace electrode and the melt or the solid constituents of the feed material, this results, in the furnace casing, in a voltage which amounts to $$\frac{1}{\sqrt{3}}$$

times the secondary voltage of the furnace transformer.

The arc voltage in turn is $$\frac{1}{\sqrt{2}}$$

times the secondary voltage, at the maximum furnace power. In combination, this means that, in three-phase operation, the arc voltage at maximum furnace power is smaller than the secondary voltage of the furnace transformer by a fractor of $$\frac{1}{\sqrt{3}\cdot\sqrt{2}}.$$

It is now an extremely important condition that the arc voltage for a three-phase furnace converted to d.c. operation, under the assumption of the same furnace size and power as in the previous three-phase operation, should be approximately the same as in the previous there-phase operation.

The mere insertion of only a rectifier arrangement between the three-phase transformer and the arc furnace would then increase the arc voltage in an inadmissable manner. A long arc with high gradient intensity would form, and this, as already described above, would have damaging effects on the refractory lining in the furnace casing.

SUMMARY OF THE INVENTION

It is therefore the object underlying the present invention to convert a three-phase arc furnace installation to direct current, in such a way that the already existing components of the installation, namely the controllable three-phase furnace transformer and the high-voltage installation, can be retained and that, with these parts of the installation, originally designed for three-phase operation, optimum d.c. operation becomes possible.

This object is achieved according to the invention by retaining of the existing furnace transformer by the connection of an adaptation member and a rectifier circuit between the secondary side of the controllable three-phase furnace transformer and at least one electrode. The most conspicuous feature is here a reduction of the voltage downstream of the furnace transformer, as required for d.c. operation, and/or an increase in the inductive reactance.

In a preferred embodiment the adaptation member is a transformer, preferably an autotransformer. By means of this, the arc voltage and hence also the arc length of the arc furnace converted to d.c. can be adjusted in an optimum manner.

Alternatively the adaptation member consists of a choke. The loss of the inductive reactance in the high-current line of the previous three-phase operation is concentrated by the insertion of an inductive reactance into the a.c.-side circuit of the converted arc furnace, and makes it possible to restore the optimum ratio of the short-circuit current to the operating current.

In another embodiment at least one choke is connected in series between the autotransformer and the rectifier arrangement. This arrangement complements the advantages of providing both an autotransformer and a choke.

Preferably, the transformation ratio of the primary voltage to the secondary voltage of the autotransformer is in the range from 1.2 to 2.5, and the ratio of the short circuit current to the operating current is in the range between 1.2 and 3.5.

With these ranges namely, on the one hand, for the transformation ratio of the primary voltage to the secondary voltage of the autotransformer and, on the other hand, for the ratio of short-circuit current to the operating current, optimum adaptation of the three-phase furnace transformer to d.c. operation becomes possible.

The use of controllable rectifiers according to for the rectifier circuit the invention enables the short-circuit current to be limited. In this way, a reduction in the inductive reactance becomes possible and an increase in the power factor is thus obtained. It is postulated here that the inductance in the d.c. circuit assumes such a value that the rate of rise of the short-circuit current can in this way be kept within tolerable limits and the controllable rectifiers can cope with their task, in spite of the time delay of the response, inherent in the controllable rectifiers.

According to the invention the electrode is arrangd as a bottom electrode in the furnace casing, which makes possible a safe and reliable electrode arrangement.

DESCRIPTION OF THE PREFERRED EMBODIMENTS

Figure 1:
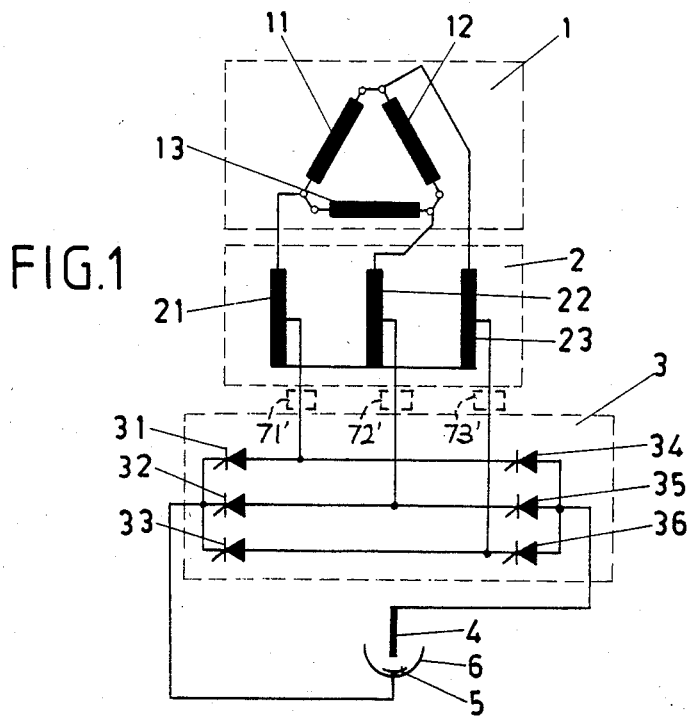
FIG. 1 is as a circuit diagram of the first embodiment of an apparatus according to the invention.

Referring now to the drawings, wherein like reference numerals designate identical or corresponding parts throughout the several views, and more particularly to FIG. 1 thereof, three windings 11, 12, 13 of the secondary side of a controllable three-phase furnace transformer 1 are connected to three windings 21, 22, 23 of an autotransformer 2. The windings 11, 12, 13 of the furnace transformer 1 are arranged, on the secondary side, as an open delta connection, and are then closed outside the transformer 1.

The windings 21, 22, 23 of the autotransformer 2 are each formed here as common primary and secondary windings. A rectifier arrangement 3, which is fitted with diode groups 31, 32, 33; 34, 35, 36 arranged in pairs, is fed as a three-phase bridge circuit by the autotransformer 2.

The d.c. side of the rectifier 3 is connected on the one hand to the electrode 4 and on the other hand to the bottom electrode 5 in the furnace casing 6.

The autotransformer 2 and, above all, its voltage tap on the secondary side for feeding the rectifier 3, is designed here in such a way that, at the maximum voltage of the existing three-phase transformer 1, and taking into account the inductive voltage drop, the resulting arc voltage on the d.c. side in the electrodes 4, 5 and the furnace casing 6 is analogous to that in the previous three-phase operation. Due to this arrangement, the converted arc furnace can be operated with d.c. at approximately the same arc length as hitherto with three-phase current.

This fact is of great importance for economical furnace operation in an arc furnace converted from three-phase current to direct current and establishes the conditions under which an arc furnace, originally designed for three-phase current, can be run with direct current under exactly the same optimum operating conditions as before with three-phase current.

If the values of the inductive reactants are too low or the voltage tap at the autotransformer 2 gives an unduly high voltage at the input of the rectifier 3, or if there are reasons for enabling the furnace power to be varied over certain ranges, a controllable rectifier fitted with thyristors is preferably used, as schematically shown in FIG. 1.

Figure 2:
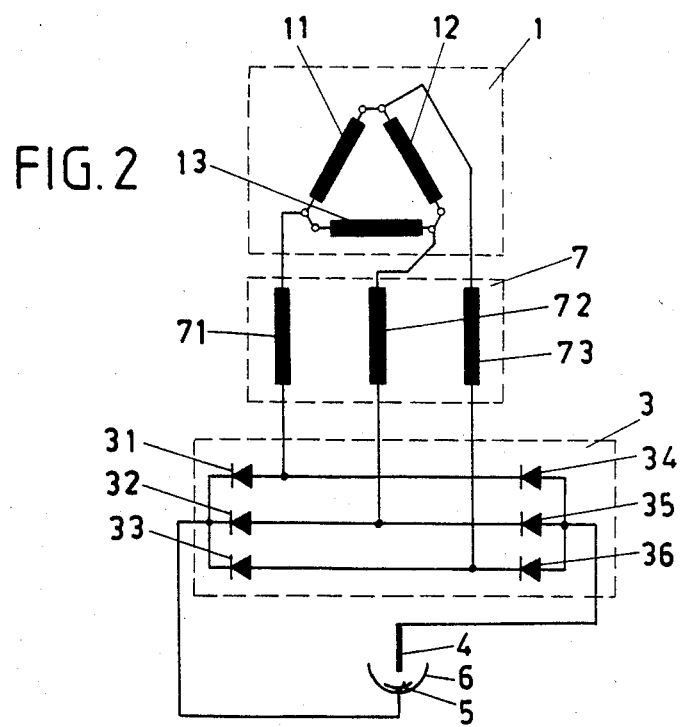
FIG. 2 shows a circuit diagram of a second embodiment according to the invention.

FIG. 2 shows in principle the same circuit arrangement as in FIG. 1, with the only difference that there is a choke arrangement 7 with the windings 71, 72, 73 in place of the autotransformer 2. The difference from FIG. 1 is that, even in the no-load condition of the arc furnace, that is to say if the current is zero, the full secondary voltage of the three-phase furnace transformer 1 is applied to the input of the rectifier 3.

The choke arrangement 7 provides the requisite inductive reactance which was lost by the conversion from three-phase current to direct current in the high-current part of the arc furnace.

With the aid of this choke arrangement 7, the same ratio of short-circuit current to operating current is that which existed previously in three-phase operation, is restored in d.c. operation.

It is self-evident that the electrical characteristics of the autotransformer 2 according to FIG. 1, particularly with respect to tapping the secondary voltage on the autotransformer, and the design of the choke 7 according to FIG. 2, must be adapted to those characteristics which apply to the arc furnace 4, 5, 6, now converted to direct current.

It has proved to be advantageous to select a transformation ratio, of the primary voltage to the secondary voltage of the autotransformer 2, which is preferably in the range between 1.2 and 2.5. This gives the optimum arc voltage of the previous three-phase operation for the d.c. operation now applicable.

However, this transformation ratio can also be outside this said range of the transformation ratio, in particular if the design of the previous three-phase arc furnace installation was not optimum with respect to its arc voltage.

If, for example, the arc voltage in the previous three-phase operation was initially designed too low, or if water-cooled casing walls were at a later stage built into the arc furnace casing, stepping down by means of an autotransformer 2 can be completely omitted and, in this case, an increase in the inductive reactance by connecting a choke arrangement 7 between the three-phase transformer 1 and the rectifier arrangement 3 according to FIG. 2 is sufficient.

In converting an arc furnace from three-phase current to direct current, it is even advantageous under certain circumstances to connect a choke arrangement 7 on the three-phase side downstream of the autotransformer 2 in series, so that an increase in the inductive reactance is obtained together with a simultaneous reduction in the secondary voltage of the furnace transformer 1. This arrangement is indicated in FIG. 1 by the winding 71', 72', 73' shown in phathom lines.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patents of the United States is:

1. An apparatus for converting an arc furnace installation from three-phase operation to d.c. operation, the arc furnace installation having a high-voltage transformer, a controllable three-phase furnace transformer, a furnace casing and at least two electrodes, comprising an autotransformer having a transformation ratio of a primary voltage to a secondary voltage in a range from 1.2 to 2.5 for increasing the inductive reactance, and a rectifier circuit connected in between a secondary side of the three-phase transformer and the electrodes.

2. An apparatus according to claim 1, comprising:
   a choke circuit connected in series between a secondary side of the autotransformer and the rectifier circuit.

3. An apparatus according to claim 1, wherein a ratio of a short-circuit current to an operating current is in a range between 1.2 and 3.5.

4. An apparatus according to claim 1, wherein said rectifier circuit comprises:
   a controllable rectifier.

5. An apparatus according to claim 1, wherein at least one of said electrodes is arranged as a bottom electrode in the furnace casing.

6. An apparatus for converting an arc furnace installation from three-phase operation to d.c. operation, the arc furnace installation having a high-voltage transformer, a controllable three-phase furnace transformer, a furnace casing and at least two electrodes, comprising:
   an autotransformer having a transformation ratio of a primary voltage to a secondary voltage in a range 1.2 to 2.5 for adjusting the secondary voltage and a rectifier circuit connected in between a secondary side of the three-phase transformer and the electrodes.

* * * * *